United States Patent
Philips et al.

(10) Patent No.: US 10,985,674 B2
(45) Date of Patent: Apr. 20, 2021

(54) ULTRASONIC MOTOR AND DRIVE DEVICE

(71) Applicant: Physik Instrumente (PI) GmbH & Co. KG, Karlsruhe (DE)

(72) Inventors: Bernd Philips, Karlsruhe (DE); Mathias Rosenkranz, Karlsruhe (DE); Dieter Wienecke, Landolfshausen (DE); Kurt Sinske, Gleichen (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 632 days.

(21) Appl. No.: 15/752,388

(22) PCT Filed: Jul. 28, 2016

(86) PCT No.: PCT/DE2016/100346
§ 371 (c)(1),
(2) Date: Aug. 2, 2018

(87) PCT Pub. No.: WO2017/028840
PCT Pub. Date: Feb. 23, 2017

(65) Prior Publication Data
US 2018/0358909 A1    Dec. 13, 2018

(30) Foreign Application Priority Data
Aug. 14, 2015    (DE) .................... 10 2015 113 472.1

(51) Int. Cl.
*H02N 2/00*    (2006.01)
(52) U.S. Cl.
CPC ........... *H02N 2/0055* (2013.01); *H02N 2/001* (2013.01)
(58) Field of Classification Search
CPC .................. H02N 2/0055; H02N 2/001
See application file for complete search history.

(56) References Cited

U.S. PATENT DOCUMENTS

2005/0258711 A1    11/2005    Funakubo
2010/0245518 A1    9/2010    Matsumoto et al.
(Continued)

FOREIGN PATENT DOCUMENTS

DE    10 2008 026 429 A1    12/2009
DE    10 2011 082 200 A1    3/2013
(Continued)

OTHER PUBLICATIONS

International Search Report for PCT Application No. PCT/DE2016/100346, 3 pages.

*Primary Examiner* — Emily P Pham
(74) *Attorney, Agent, or Firm* — Finch & Maloney PLLC (57) ABSTRACT

The invention relates to an ultrasonic motor comprising a plate-shaped piezoelectric ultrasonic actuator (2) and a of friction element (5) arranged on a side surface thereof, wherein the connection line (V) through the friction point and the focal point (S) of the ultrasonic actuator defines an operating direction, and a perpendicular plane intersecting the ultrasonic actuator defines an operating plane (W). A holder (6) has two force inlet sections (7) in order to move the holder and thereby the ultrasonic actuator in a direction parallel to the operating direction, and to press same against an element to be driven. The force inlet sections, preferably based on permanent magnets (8, 9) are each arranged in the operating plane and laterally next to and at a distance from the the ultrasonic actuator, and the intersection point (SP) of the connection line (V) with the operating plane (W) either coincides with the focal point (S) or lies between the focal point and the side surface having the friction element.

17 Claims, 5 Drawing Sheets

(56) References Cited

U.S. PATENT DOCUMENTS

| | | |
|---|---|---|
| 2011/0141584 A1 | 6/2011 | Henderson et al. |
| 2011/0175489 A1 | 7/2011 | Wischnewskij et al. |
| 2013/0140953 A1 | 6/2013 | Miyazawa |
| 2014/0001922 A1* | 1/2014 | Wischnewskiy ..... H02N 2/0025 310/323.02 |
| 2014/0246955 A1 | 9/2014 | Rosenkranz |
| 2015/0042209 A1* | 2/2015 | Wischenwskiy ....... H02N 2/007 310/323.16 |
| 2016/0036352 A1 | 2/2016 | Hubner |

FOREIGN PATENT DOCUMENTS

| | | |
|---|---|---|
| DE | 10 2013 204 026 A1 | 9/2014 |
| DE | 10 2014 222 026 B3 | 2/2016 |

* cited by examiner

ULTRASONIC MOTOR AND DRIVE DEVICE

The invention relates to an ultrasonic motor according to claims 1 to 12, and a driving device according to claim 13.

From DE 10 2013 204 026 A1, according to FIG. 8, an ultrasonic motor is known, in which an ultrasonic actuator is held in an actuator holder, and two springs act on the actuator holder, said springs pressing the actuator holder and with the same the ultrasonic actuator against a goniometer metal plate. The goniometer metal plate comprises an aperture, through which a friction element projects, which is provided contact with an element to be driven.

The gonimeter plate in this case allows in particular a pivoting of the actuator holder and thus also of the ultrasonic actuator about an axis, which runs through the contact point or the contact surface between the friction element and an element to be driven and parallel to the longitudinal extension direction of the goniometer plate or parallel to the longitudinal extension direction of the ultrasonic actuator. In other words, the goniometer plate allows a pivoting of the actuator holder or ultrasonic actuator about the contact point or the contact surface between the friction element and the element to be driven out of the plane in which the actuator holder or the ultrasonic actuator lies in the non-pivoted state. As a result, the friction element can adapt its orientation relative to the corresponding contact surface of the element to be driven, so that there is always an optimum contact between the friction element and the contact surface of the element to be driven.

A disadvantage of the ultrasonic motor known from DE 1 2013 204 026 A1 that the springs force the previously described pivoting of the actuator holder or ultrasonic actuator. This is because as soon as the actuator holder has left the ideal or non-pivoted position shown in FIG. 8 by pivoting, force components of the springs result in a direction which is arranged substantially perpendicular to the main surfaces of the ultrasonic actuator, wherein these force components cause the started pivoting to be further advanced and enhanced. A pivoting back of the actuator holder or ultras actuator and thus the intended optimum contact between the friction element and the corresponding contact surface of the element to be driven is thus made more difficult. This ultimately results in a less effective acid less reliable ultrasonic motor.

A further disadvantage of the springs used is their non-linear force deployment, so that an increasing relaxation of the springs is accompanied by a reduction of the contact force of the friction element against the element to be driven. Also this fact leads to a less effective and less reliable ultrasonic motor.

It is therefore the object of the invention to provide an ultrasonic motor which is capable to reduce or to eliminate the above-mentioned disadvantages of known ultrasonic motors. In particular, the object of the invention is to provide a more effective and more reliable ultrasonic motor.

This object is solved by an ultrasonic motor according to claim 1, wherein the subsequent dependent claims comprise at least expedient configurations and developments.

As a result, the starting point is an ultrasonic motor comprising an ultrasonic actuator, which is mounted in a holder and which has the form of a plate with two main surfaces which are largest and which are arranged opposite one another, and at least four side surfaces which connect the main surfaces to one another, wherein a friction element whith is provided for frictional contact with an element to be driven is disposed on one of the side surfaces and wherein the side surface which lies opposite to the friction element thereby defines a counter-side surface. The friction contact between the friction element and the element to be driven, preferably via a friction surface of the element to be driven, is either point-shaped or flat so that either a point contact or a surface contact prevails.

In addition, the direction of a connection line V which runs through the friction point or the friction surface and the center of gravity S of the ultrasonic actuator and in this case parallel to the main surfaces of the ultrasonic actuator, defines an effective direction. Further a plane, through which the connection line passes at an essentially perpendicular angle and which intersects theultrasonic actuator, in effective plane W. The previously used expression 'essentially' means here and in an analogous manner also at corresponding further points of the description that a slight deviation of +/−5% is possible.

The holder comprises at least two force lntreduction sections, which introduce a force into the holder in order to displace the latter and with the latter the ultrasonic actuator in a direction parallel to the effective direction. In this case, also only one component of the force introduced into the holder can provide for the displacement thereof in a direction parallel to the effective direction. The described displacement results in the friction element being pressed against the element to be driven, so that, at a given friction coefficient between the material of the friction element and the material of the element to be driven or the friction surface of the element to be drive the transmission of drive forces from the friction element to element to be driven is made possible.

Essential to the invention is that the force input sections are respectively arranged in or lie in the effective plane W, wherein the intersection point SP of the connection line V with the effective plane W either coincides with the center of gravity S of the ultrasonic actuator or else lies between the center of gravity S of the ultrasonic actuator and the side surface of the ultrasonic actuator on which the friction element is arranged. This results in an arrangement of the force introduction sections, in which these are respectively located laterally next to and at a distance from the ultrasonic actuator. In this way a force introduction into the holder is achieved, in which a forced and self-boosting pivoting of the holder or the ultrasonic actuator about an axis which lies within the plane of the contact surface between the friction element and the element to be driven by the friction element and which runs parallel to the longitudinal direction of extension of the ultrasonic actuator, is made more difficult or prevented. This is due to the fact that the distance between the corresponding force introduction point and the plane of the contact surface between the friction element and the element to be driven by the friction element is small, and, as a result, the lever for a force or force component which acts on the force introduction point in a direction, which is substantially perpendicular to one of the main surfaces of the ultrasonic actuator, is also small, so that comparatively high forces are necessary for the previously described pivoting of the holder or ultrasonic actuator.

It can be advantageous that at least one of the force introduction sections is formed by a first permanent magnet and two second permanent magnets arranged opposite the first permanent magnet, respectively, and that the first permanent magnet and the two second permanent magnets interact in such a manner that one of the second permanent magnets exerts an attracting force on the first permanent magnet, and the other of the second permanent magnets exerts a repelling force on the first permanent magnet. In this way, the introduction of a constant force into the holder along its displacement path is possible, so that in principle the friction element of the ultrasonic actuator is pressed against the element to be driven with a constant force independently of the (displacement) position of the holder. In addition, the arrangement of the permanent magnets counteracts the previously described pivoting of the holder or ultrasonic actuator.

It is conceivable that the permanent magnets of the force introduction sections at least partially are replaced by corresponding magnetizable materials. In addition, it is conceivable, characterized in that the permanent magnets are completely or partially replaced by electromagnets.

It can also be advantageous that the holder comprises a holding frame in which the ultrasonic actuator is held or inserted without play, and a holding device which coacts with the holding frame.

Further, it may be of advantage that the holder comprises a linear guidance section, which is formed by corresponding portions of the holding frame and the holding device and which allows a linear movement of the ultrasonic actuator in a direction parallel to the effective direction and, at the same time, a rotation of the ultrasonic actuator about an axis K which runs through the ultrasonic actuator substantially parallel to the side surface on which the friction element is arranged and substantially parallel to the main surfaces of the ultrasonic actuator. In other words, the linear guidance section allows a displacement of the holder or ultrasonic actuator in the direction of the element to be driven, wherein at the same time a pivoting of the holder or ultrasonic actuator about the contact point or the contact surface between the friction element and the element to be driven is made possible, wherein the corresponding pivot axis VA runs substantially parallel to the longitudinal extension direction of the ultrasonic actuator or of the holder.

Furthermore, it can be advantageous that the linear guidance section is formed by at least one substantially slot-shaped or elongated hole-shaped recess in the holding device and by at least one correspondingly shaped projection portion of the olding frame. In this way, a linear guidance section which can be realized in a particularly simple and cost-effective manner is achieved.

In addition, it can be advantageous that the holder comprises at least one rotation bearing section which is formed by corresponding sections of the holding frame and the holding device, and which allows a rotation of the ultrasonic actuator about the axis K or a pivoting about the pivot axis VA, wherein the potation bearing section at the same time allows a linear movement of the ultrasonic actuator in a direction parallel to the effective direction.

Furthermore, it can be advantageous that, by means of the linear guidance section and/or the rotation bearing section, all further possible degrees of freedom of movement of the ultrasonic actuator are prevented.

In addition, it can be advantageous that the rotation bearing section is formed by a pin-shaped section formed integrally with the holding frame and comprising end sections on both sides, wherein the end sections have a convex geometry and are supported in each case by a flat section of the holding device. In a particularly preferred manner, the end sections have a circular section geornety, wherein the underlying circle has a diameter which corresponds to the distance, between the opposing flat sections of the holding device on which the end sections are supported. In a particularly simple manner, this makes it possible for the holding frame to be able to rotate about the axis K relative to the holding device, and at the same time, in the case of the given engagement ratio, a linear displacement of the holding frame relative to the holding device is possible.

It can also be advantageous for the ultrasonic actuator to be adhesively bonded to the holding frame at least on sections of the main surfaces. In this case, it can be advantageous in, particular that the sections of the main surfaces of the ultrasonic actuator, which are adhesively bonded to the holding frame, represent no portions at which the ultrasonic actuator forms oscillation nodes during operation. Usually, it is necessary or at least advantageous to hold the ultrasonic actuator there, where it forms oscillation nodes during operation. As a result, in particular the intended vibration of the ultrasonic actuator is not negatively influenced, and the low-freedom movement for the holder is present at these sections.

In addition, it can be advantageous that the holding frame comprises polyetheretherketone and preferably consists of polyetheretherketone. This thermoplastic material is characterized in particular by high thermal resistance. It can furthermore be bonded or adhesively bonded well and permanently to the ceramic, preferably a PZT ceramic, and comprises advantageous damping properties for the application according to the invention.

It can also be advantageous for the holding device to be formed integrally with a housing in which the control electronics for the ultrasonic motor can be arranged. In this way, a very compact and highly integrated embodiment of the ultrasonic motor according to the invention can be realized.

It is shown in a schematicand not-to-scale manner:

FIG. 1: an ultrasonic motsr according to the invention in perspective representation.

Figure 1:
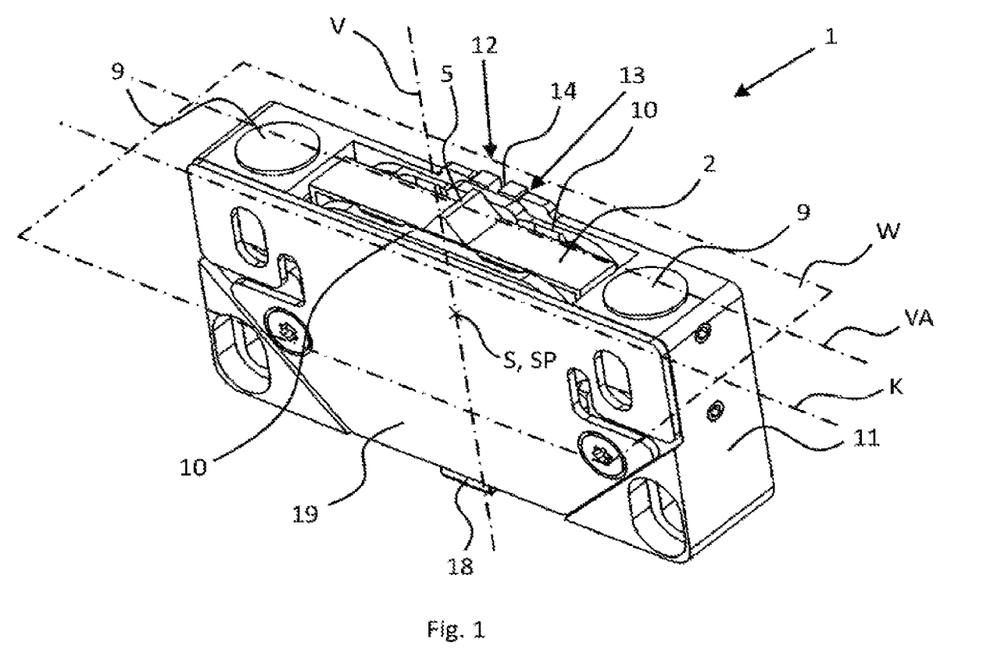

FIG. 1 shows an embodiment of an ultrasonic motor according to the invention in which the ultrasonic actuator 2 is disposed in a holding frame 10 made of polyetheretherketone, wherein the ultrasonic actuator has the form of a plate made of a piezoceramic material with two main surfaces which are the largest in terms of area and with four side surfaces connecting the main surfaces to each other, wherein the ultrasonic actuator 2 is bonded to the holding frame at portions of its main surfaces. The holding frame 10 is inserted into one holding device 11 in such a way that essentially only the friction element 5, which is arranged on one of the long side surfaces of the ultrasonic actuator, protrudes from or protrudes out of the holding device.

The friction element 5 is provided for (friction) contact with an element to be driven which is not shown, and comprises a friction surface for this purpose. The orientation of a connection line V, which runs through the friction surface of the friction element 5 and through the center of gravity of the ultrasonic actuator 2 and parallel to the main surfaces, defines an effective direction in which or parallel to which the ultrasonic actuator or the friction element arranged thereon is pressed substantially against the element to be driven.

An effective plane W is defined as a plane through which the connection line essentially perpendicularly passes and which at the same time intersects the ultrasonic actuator or lies within the ultrasonic actuator.

The intersection point SP is defined by the intersection point of the connection line V and the active plane W. In the exemplary embodiment according to FIG. 1, the intersection point SP coincides with the center of gravity of the ultrasonic actuator.

A protrusion portion 14 is integrally formed with the support frame and engages in a substantially slot-shaped recess 13 of the holding device 11 and co-acts with the same in such a manner that a linear guidance portion is obtained which allows a linear movement of the holding frame and thus a linear movement of the ultrasonic actuator in a direction parallel to the effective direction and, at the same time, a slight rotational movement of the ultrasonic actuator about an axis K, which extends through the ultrasonic actuator substantially parallel to the side surface on which the friction element is disposed and substantially parallel to of the surfaces.

In the holding device 11 permanent magnets 9 are inserted, which in each case are arranged laterally next to a short side surface of the ultrasonic actuator. On each side in this case two permanent magnets 9 are disposed, of which respectively only one is shown in FIG. 1. The respective two permanent magnets 9 interact with a permanent magnet which is inserted in the holding frame and which cannot be seen in FIG. 1 also.

The holding device 11 is of two-part design for assembly reasons and, after insertion of the holding frame with the ultrasonic actuator held therein, is screwed to an elastic or resilient cover plate 19, which presses the holding frame 10 or the projection section 14 thereof with a defined force into the slot-shaped recess 13 of the holding device.

Figure 2:
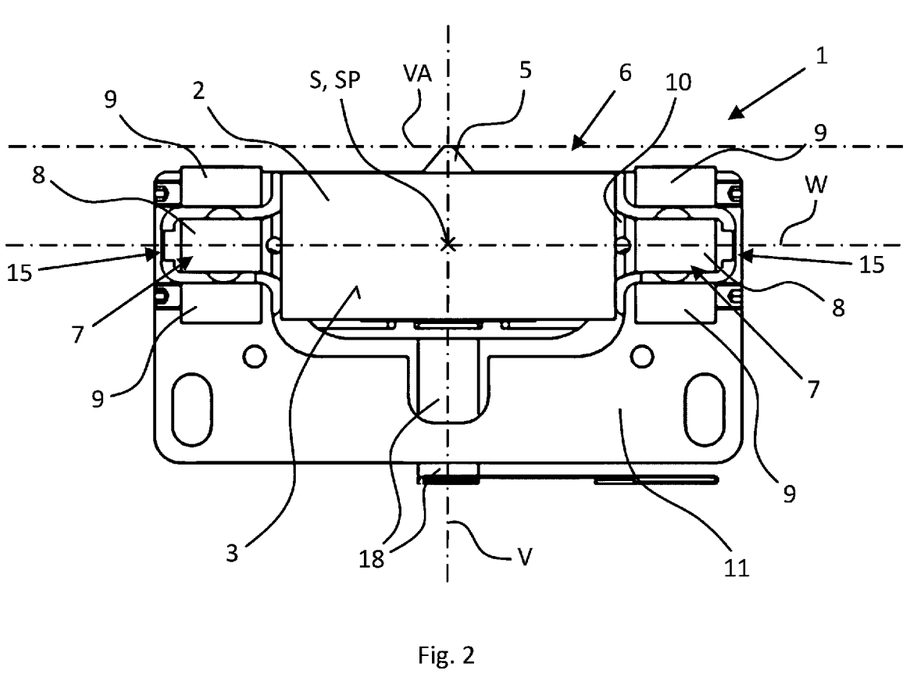
FIG. 2: a sectional view of the ultrasonic motor according to FIG. 1, FIG. 3: a further sectional view of the ultrasonic according to FIG. 1, FIG. 4: a side view of the ultrasonic motor according to FIG. 1, FIG. 5: an exploded iew of the ultrasonic motor according to FIG. 1, FIG. 6 a further exploded view of the ultrasonic motor according to FIG. 1.

FIG. 2 shows a section of the ultrasonic motor according to FIG. 1 along a plane spanned by the line V and the axis K, which intersects the ultrasonic actuator.

On the basis of this sectional representation, the details of the two force input sections 7 in each case arranged laterally next to the ultrasonic actuator or the short side surfaces can be seen, wherein each force introduction section comprises two permanent magnets 9, which are arranged in the holding device 11, and one permanent magnet arranged in the holding frame. While the permanent magnets are in each case fixed via one screw connection within a corresponding opening of the holding device 11, the permanent magnets 8 are glued in the respective opening of the holding frame 10.

The in FIG. 2 in each case upper permanent magnet 9 has attracting effect on the respective permanent magnet 8, while the corresponding lower permanent magnet 9 has a repelling effect on the same permanent magnet. Thus, each force transmission section exerts a force on the holding frame and thus on the ultrasonic actuator, which seeks to move the latter in a direction parallel to the effective direction. It should be emphasized that the two force transmission sections are realized completely identical, and also, overall, there is a symmetry with regard to the ultrasonic motor according to the invention, wherein the connection line simultaneously represent of symmetry.

In the area of the force transmission sections 7, the holding frame comprises rotation bearing sections 15, wherein the holding frame is formed integrally or in one piece with the latter. In this case each rotation bearing section comprises a pin-shaped section with distal end sections disposed on both sides with a convex geometry, wherein the convex-shaped end portions respectively are supported an a planar counter surface of the mounting device.

A flexible conductive path 18 comprises the electrical lines for the ultrasonic actuator, which electrically conductively contact the same on its main surfaces 3. A part of the flexible conductive path 18 lies within the holder 6 in a cavity provided for this purpose and is guided out of the holder via a corresponding opening in the holder for connection to an electrical excitation device.

Figure 3:
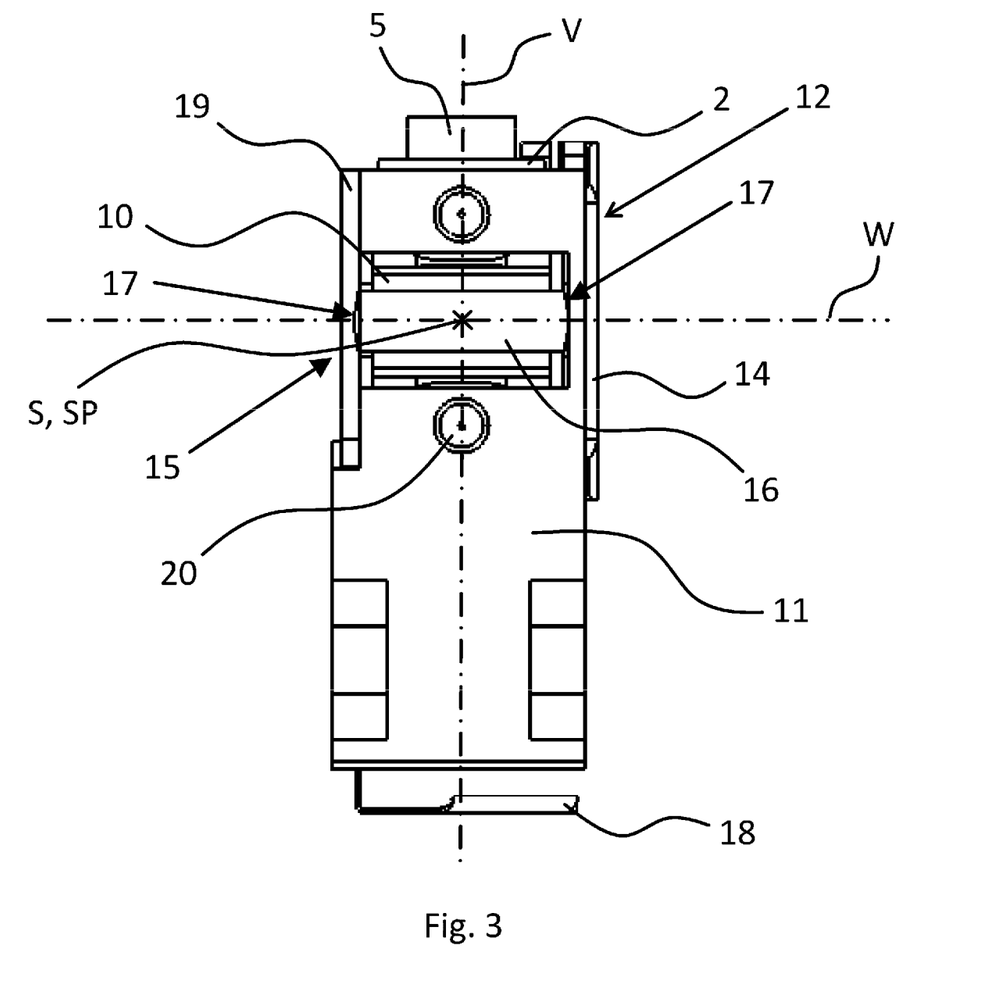

FIG. 3 shows a section of the ultrasonic motor according to FIG. 1 along a plane, which perpendicularly intersects both the plane spanned by the line V and the axis K, and the effective plane W.

In FIG. 3, in particular the structure or the realization of the rotation bearing sections 15 can be seen, each of which comprise a pin-shaped section 16 which is integrally formed with the holding frame 10 and whose axis of symmetry coincides with the effective plane W. At its two end sections 17, the pin-shaped section 16 has a circular section geometry, wherein the respective diameter of the corresponding circle corresponds to the distance between the flat surfaces of the holding device 11 on which the end sections 17 are supported. The left end section in FIG. 3 is supported on an associated flat section of the cover plate 19, while the right end section is supported on an associated flat section of the further part of the holding device 11.

The above-described geometry of the end sections 17 makes it possible for the holding frame to be able to perform a rotational movement about the axis K or a pivoting movement about the pivot axis VA. At the same time, the correspondingly small contact area between the end sections and the respectively associated planar section of the holding device allows also displacement of supporting frame in a direction parallel to the effective direction.

FIG. 3 also shows the fastening elements 20 in the form of screws which surround the permanent magnets within the holding device 11.

Figure 4:
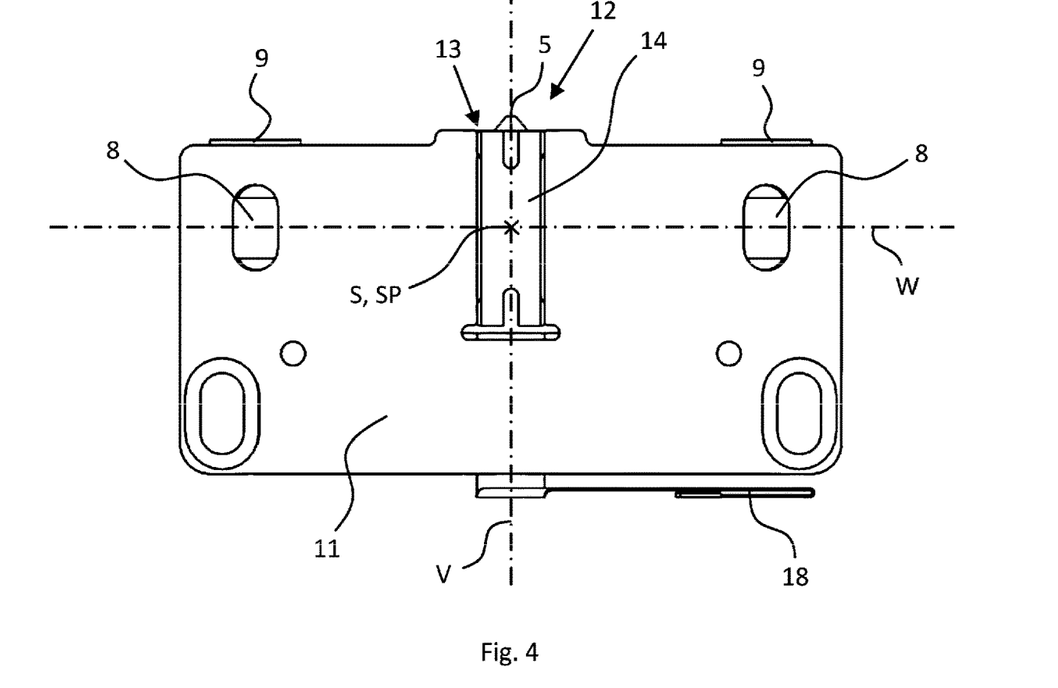
Figure 5:
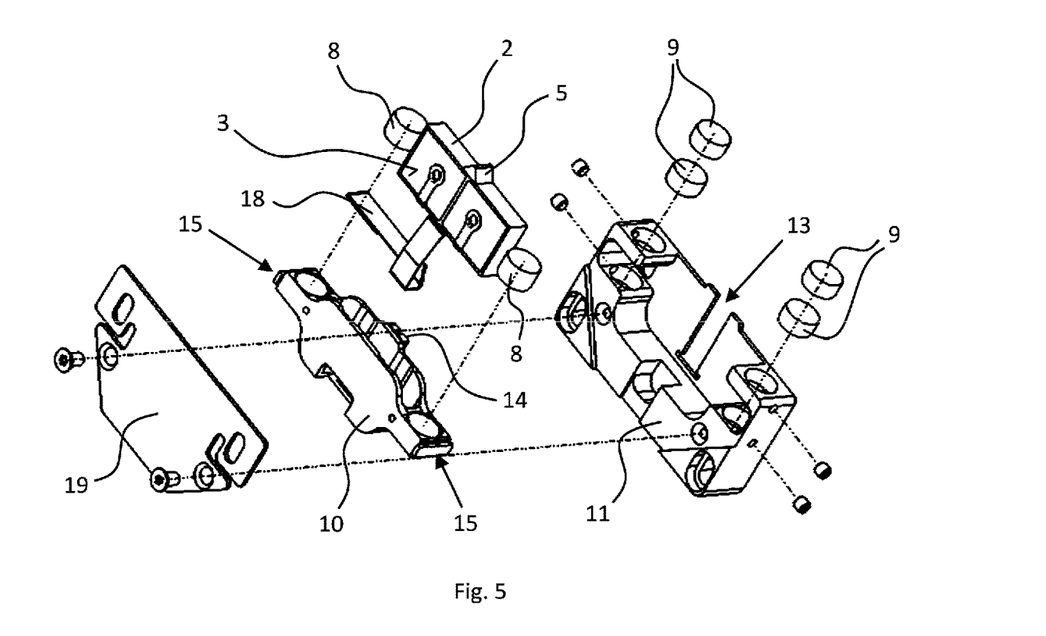
Figure 6:
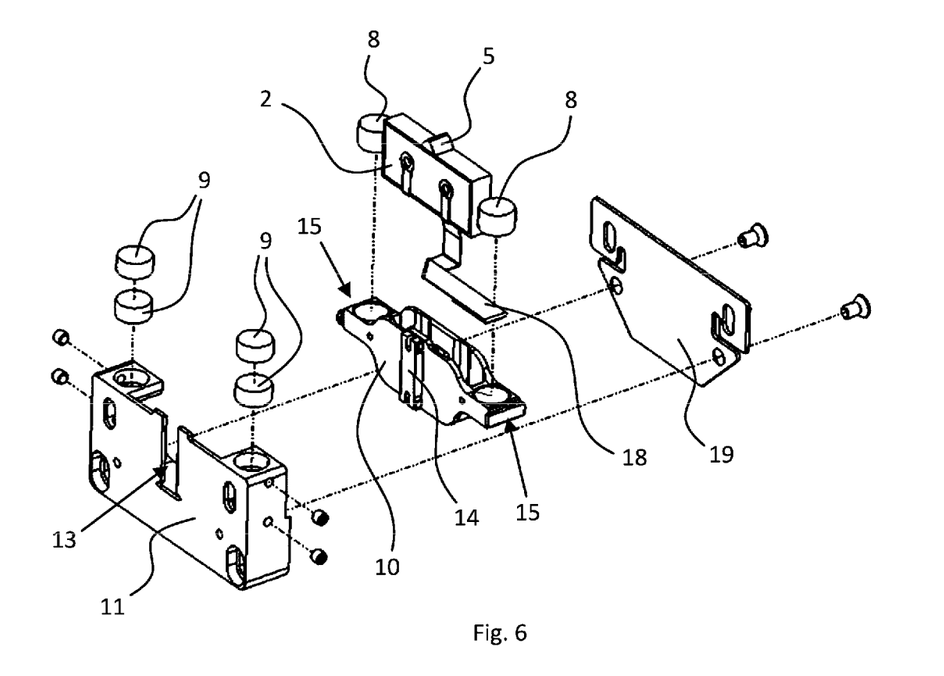

FIG. 4 shows the ultrasonic motor according to the invention according to FIG. 1 in a side view with a view toward the portion of the ultrasonic motor of a rear side in FIG. 1 which is therefore there not or only partially recognizable. The linear guidance section 12 can be seen particularly well in this view.

The linear guidance section 12 comprises the substantially slot-shaped recess 13 of the holding device 11 and the correspondingly shaped projection section 14 which is formed in one piece with the holding frame 10 and whith extends into or extends through the slot-shaped recess 13, wherein the width of the projection section 14 corresponds approximately to the width of the recess 13, so that the projection section is arranged substantially without play in the recess 13. The recess 13 widens in the lower region, i.e., there the distance between the opposing side walls is greater than the width of the projection section 14. In addition, the recess 13 has a greater length than the projection section 14.

By the corresponding engagement conditions the holding frame is allowed to move with respect to a linear movement only along the longitudinal orientation of the substantially slot-shaped recess, so that a linear ouidance results. At the same time, this engagement ratio allows a certain rotation of the holding frame about the axis K in order to ensure that the friction element and its friction surface, respectively, can align itself to the surface or contact surface of the element to be driven.

The projection section 14 is slit at each of its two distal ends, so that corresponding limbs of the projection section result which impart to the latter in the region of said limbs increased flexibility or elasticity which are able to compensate for production tolerances, so that a play-free guidance of the projection section within the slot-shaped recess is made possible.

Furthermore, it can be scan that the holding device comprises a projecting section in the region of the linear guidance section 12, so that in this region the distance of the upper edge of the holding device from the distal or free end of the friction element or from its friction surface is smaller than in the adjacent region of the holding device, which results in a reduction of a possible torque in the area of the corresponding contact area between the projection section and the slot-shaped recess and thus also reduces the corresponding force or wear load.

The invention claimed is:

1. An ultrasonic motor comprising:
    an ultrasonic actuator comprising
        a plate with two main surfaces arranged opposite one another and with at least four side surfaces which connect the two main surfaces to one another, each of the two main surfaces having an area greater than an area of any one of the at least four side surfaces; and
        at least one friction element disposed on one of the at least four side surfaces, the at least one friction element comprising a friction point or a friction surface for friction contact with an element to be driven; and
    a holder in which the ultrasonic actuator is inserted, the holder comprising at least two force introduction sections to introduce force into the holder to displace the holder and the ultrasonic actuator in a direction parallel to an effective direction,
    wherein a direction of a connection line V which runs through the friction point or the friction surface and through a center of gravity S of the ultrasonic actuator defines the effective direction,
    wherein a plane through which the connection line V passes at an essentially perpendicular angle and intersects the ultrasonic actuator defines an effective plane W, and
    wherein the at least two force introduction sections are disposed in each case in the effective plane W and laterally next to and at a distance from the ultrasonic actuator and an intersection point SP of the connection line V with the effective plane W either coincides with the center of gravity S or is disposed between the center of gravity S and the one of the at least four side surfaces.

2. The ultrasonic motor according to claim 1, wherein at least one of the at least two force introduction sections is formed by a first permanent magnet and two second permanent magnets arranged opposite the first permanent magnet in each case, and wherein the first permanent magnet and the two second permanent magnets interact in such a way that one of the second permanent magnets exerts an attracting force on the first permanent magnet, and the other of the second permanent magnets exerts a repulsive force on the first permanent magnet.

3. The ultrasonic motor according to claim 1, wherein the holder comprises a holding frame in which the ultrasonic actuator is held without play and a holding device which interacts with the holding frame.

4. The ultrasonic motor according to claim 3, wherein the holder comprises a linear guidance section which is formed by corresponding sections of the holding frame and the holding device and which allows a linear movement of the ultrasonic actuator in a direction parallel to the effective direction and at the same time a rotation of the ultrasonic actuator about an axis K which runs through the ultrasonic actuator substantially parallel to the one of the at least four side surfaces and substantially parallel to one of the two main surfaces.

5. The ultrasonic motor according to claim 4, wherein the linear guidance section is formed by at least one substantially slot-shaped recess in the holding device and by at least one correspondingly shaped projection section of the holding frame.

6. The ultrasonic motor according to claim 4, wherein the holder comprises at least one rotation bearing section which is supported by corresponding sections of the holding frame and of the holding device and which allows the rotation of the ultrasonic actuator about the axis K, wherein the at least one rotation bearing section at the same time allows a linear movement of the ultrasonic actuator in a direction parallel to the effective direction.

7. The ultrasonic motor according to claim 6, wherein one or more of the linear guidance section and the at least one rotation bearing section prevent all further possible mobility degrees of freedom of the ultrasonic actuator.

8. The ultrasonic motor according to claim 6, wherein the at least one rotation bearing section is formed by a pin-shaped section which is formed integrally with the holding frame and which comprises end sections on both sides, wherein the end sections have a convex geometry and are each supported on a planar section of the holding device.

9. The ultrasonic motor according to claim 3, wherein at least two sections of the two main surfaces are adhesively bonded to the holding frame.

10. The ultrasonic motor according to claim 9, wherein the at least two sections of the two main surfaces do not represent any portions at which the ultrasonic actuator forms oscillation nodes during operation.

11. The ultrasonic motor according to claim 3, wherein the holding frame comprises polyetheretherketone.

12. The ultrasonic motor according to claim 3 further comprising a housing integrally formed with the holding device to accommodate control electronics of the ultrasonic actuator.

13. A drive device comprising an ultrasonic motor according to claim 1 and the element to be driven.

14. The ultrasonic motor according to claim 7, wherein the at least one rotation bearing section is formed by a pin-shaped section which is formed integrally with the holding frame and which comprises end sections on both sides, wherein the end sections have a convex geometry and are each supported on a planar section of the holding device.

15. The ultrasonic motor according to claim 8, wherein the end sections have a circular section geometry.

16. The ultrasonic motor according to claim 11, wherein the holding frame consists of polyetheretherketone.

17. The ultrasonic motor according to claim 14, wherein the end sections have a circular section geometry.

* * * * *